United States Patent [19]
Hanson

[11] Patent Number: 5,436,773
[45] Date of Patent: Jul. 25, 1995

[54] ENHANCED LINEARITY RANGE FOR MAGNETO RESISTIVE TRANSDUCER SERVO BY CHANGING THE DIRECTION OF THE BIAS CURRENT

[75] Inventor: Weldon M. Hanson, Rochester, Minn.

[73] Assignee: International Business Machines Corporation, Armonk, N.Y.

[21] Appl. No.: 258,309

[22] Filed: Jun. 10, 1994

[51] Int. Cl.$^6$ .......................... G11B 5/03; G11B 5/596
[52] U.S. Cl. .................... 360/66; 360/77.080
[58] Field of Search ............. 360/61, 66, 77.08, 113

[56] References Cited

U.S. PATENT DOCUMENTS

| | | | |
|---|---|---|---|
| 4,012,781 | 3/1977 | Lin | 360/113 |
| 4,040,113 | 8/1977 | Gorter | 360/113 |
| 4,142,218 | 2/1979 | Gorter | 360/113 |
| 4,660,113 | 4/1987 | Nomura et al. | 360/113 |
| 4,782,415 | 11/1988 | Vinal | 360/113 |
| 4,878,140 | 10/1989 | Gill et al. | 360/113 |
| 4,922,360 | 5/1990 | Takano et al. | 360/113 |
| 5,070,421 | 12/1991 | Sumiya et al. | 360/77.07 |
| 5,079,663 | 1/1992 | Ju et al. | 360/77.01 |

OTHER PUBLICATIONS

IBM Technical Disclosure Bulletin, vol. 33, No. 5, Oct. 1990, 391–393; "Adjustable Read Bias Current for Enhanced Head Reliability" by G J Kerwin.

*Primary Examiner*—Aristotelis Psitos
*Assistant Examiner*—Won Tae C. Kim
*Attorney, Agent, or Firm*—Robert W. Lahtinen; Roy W. Truelson

[57] ABSTRACT

The linear range of a servo system for a magnetic storage device using a compared amplitude burst servo pattern and a magneto resistive (MR) sensor is enhanced by reversing the bias current. With the servo bursts displaced to opposite sides of the track centerline, the bias current is reversed to have the read function occur when the sensor is electrically biased to present the higher gain, more uniform end portion of the readback sensitivity profile at the side of the track at which the burst is written. Reversing the bias current in an MR sensor causes the readback sensitivity profile to be mirrored about the sensor center enabling the more uniform portion of the sensor response to be used to sense the respective servo pattern bursts. Where differences occur in MR gain between bias current directions, normalization or other correction is provided to compensate for variation in sensor gain.

11 Claims, 9 Drawing Sheets

ENHANCED LINEARITY RANGE FOR MAGNETO RESISTIVE TRANSDUCER SERVO BY CHANGING THE DIRECTION OF THE BIAS CURRENT

The present invention pertains to magnetic data storage devices and more particularly to servo systems for such devices that employ magneto resistive (MR) transducer heads.

BACKGROUND OF THE INVENTION

In a magnetic disk drive, the positioning of the transducer head over data tracks in alignment with the track centerline is accomplished using a "servo loop" including a mechanical actuator with a feedback path utilizing servo patterns written at the time of manufacture on sector segments or surfaces of the disk pack reserved for servo information. The servo patterns, head parameters, disk parameters and detection methods are customized to the specific application to ensure a linear response across the track or portion of the track. Measurable characteristics of the functionality of the servo system are the linearity achieved, the range over which the linear region is maintained, and the repeatability with respect to the signal to noise ratio, defects, and variations in the head's and disk's physical dimensions and magnetic properties.

Recent advances in magnetic recording heads have incorporated a magneto resistive (MR) element to sense the flux from the media. The MR element is typically biased to provide linearity, polarity and maximum sensitivity for detecting transitions written on the disk. The effects of biasing the sensor in combination with the physical geometry of the sensor cause non-uniformity of the read sensitivity along the length of the sensor with greater amplitude sensitivity occurring near one end. The non-uniformity of the read sensitivity along the length of the sensor causes non-linearity and a reduction in the width of the linear region of the servo systems position error signal (PES) for an amplitude type detection method. The PES's linear region becomes progressively more curved and narrower as the sensor's response along the MR elements length becomes more asymmetrical.

SUMMARY OF THE INVENTION

Reversing the bias current in an MR sensor causes the read back sensitivity profile to be mirrored about the center of the sensor. The technique of the present invention improves the PES linearity and range by altering the MR sensor's readback sensitivity while reading the servo burst displaced to one side of the track centerline as compared to that used to read the burst displaced to the other side of the track centerline by reversing the bias current. In this manner the more uniform higher gain portion of sensor response may be used to sense each of the servo patterns irrespective of the side of track center toward which it is displaced.

The principal benefit attained from implementation of the technique is to improve the servo system PES linearity by providing a more uniform and wider linear region from an MR sensor with an asymmetrical or non-uniform response. However, employment of the invention also provides benefits including reduction of the servo time required to write servo patterns during device manufacture, simplification of the microcode used for head positioning and improvement in the ability to compromise between servo and data requirements for the MR stripe height and length dimensions.

The reduction in servo writer time is realized by allowing wider servo patterns to be utilized for a given pitch while maintaining good linearity. An example being a servo system usage of 'half track' patterns instead of third track patterns to achieve linearity across the width of the track pitch. The use of wider servo patterns also provides as a collateral benefit, higher servo signal amplitude due to the presence of fewer erase bands. Simplification of servo positioning is achieved by reducing the number of PES curves required to construct a linear PES.

The improved ability to compromise between constraints placed on the MR head design for the data and servo is based on the servo system requirements for a head with wider read width (in relation to data requirements) to maintain good PES linearity. Data requirements are generally optimized to provide a written track of larger width than the MR sensor's read width to maintain good soft error rate performance with file track misregistration (TMR). The present solution effectively increases the functional width of the sensor by selectively using the higher gain, more uniform portion of the MR stripe sensitivity for sensing the servo patterns thereby widening the response of the MR stripe's sensitivity.

DETAILED DESCRIPTION

Figure 1:
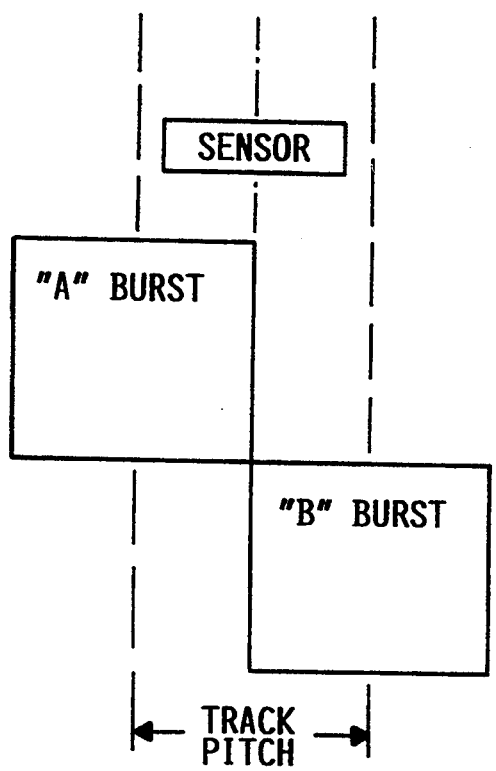
FIG. 1 is a schematic illustration of the dual burst servo pattern for determining track misregistration or sensor position during track follow or positioning.

FIG. 1 is a schematic showing of a servo system illustrating the magneto resistive (MR) sensor positioned in alignment with the centerline of a data track, which is centered between the amplitude bursts A and B which are laterally displace by a half track pitch. The position error signal (PES) representative of the offset of the head from the track centerline is obtained by calculating $(A-B)/(A+B)$ as the sensor moves along the track where A and B correspond to the amplitude of the read back signal from the A and B bursts respectively.

Figure 2:
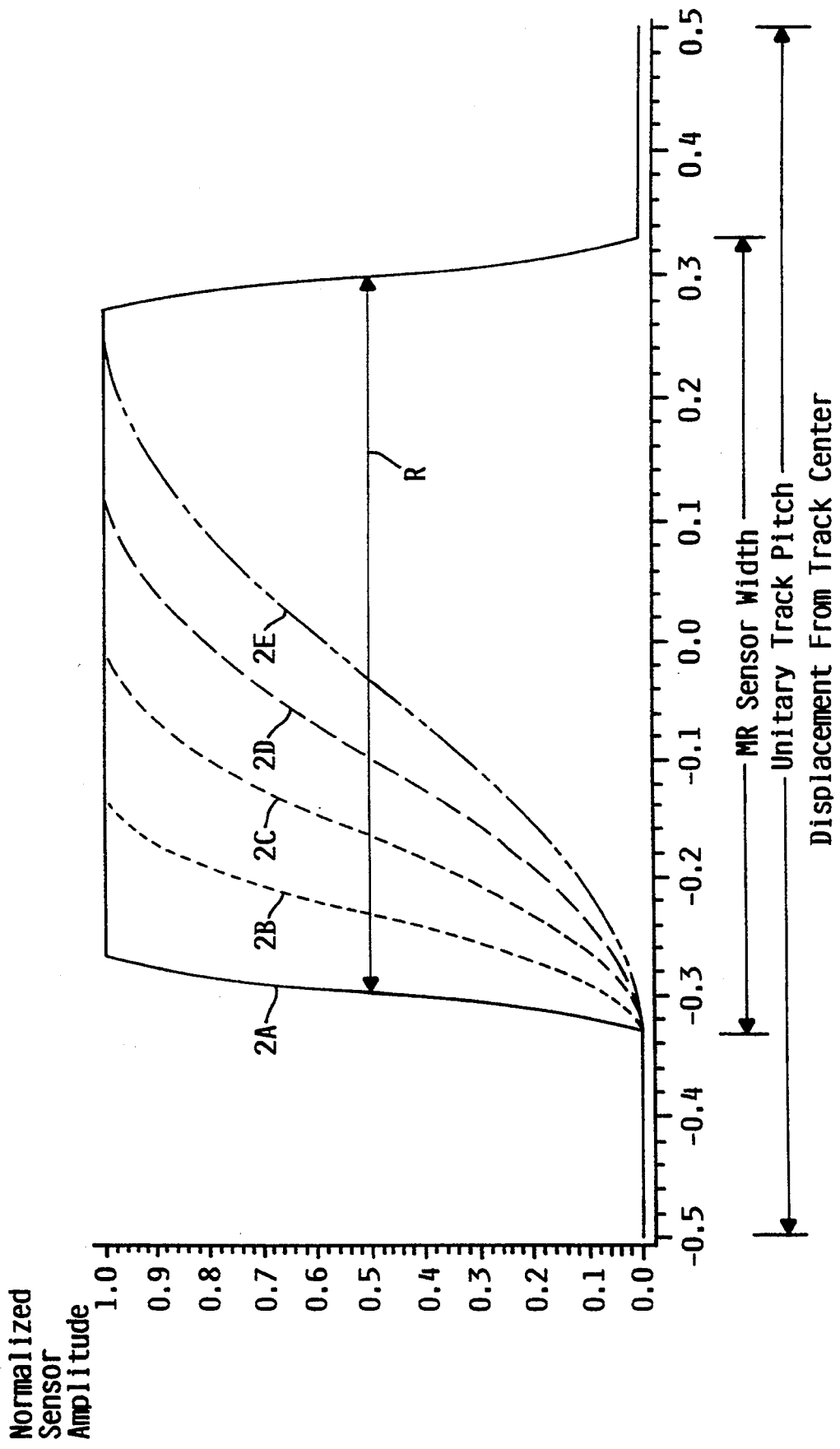
FIG. 2 is a graph modeling MR sensor amplitude responses along the length of an MR sensor for such devices with varying asymmetries.

FIG. 2 illustrates the MR sensor responses having increasingly asymmetrical amplitude readback characteristics relative to the position along the MR stripe. The example modeled uses a unity track pitch and an MR sensor length of ⅔ the track pitch. The solid line curve 2A is the response curve where the varied response portion of the sensor is 10% of each side of the read width and produces an amplitude profile similar to that which occurs when an inductive read head is used. The other curves: 2B, 2C, 2D and 2E show the progressively increasing asymmetrical response profiles of sensor devices with 30%, 50%, 70% and 90% of the left side of the amplitude being varied. At a reference level of 50% of the peak response, the distance along line R from the curve at the left side of each profile to the common curve at the right side of the profile shows the reduction of the PES linear response region with the increase of the varied signal amplitude which occurs as a function of the shape of the sensor. The varied response shown by the family of curves is a result of the length to height ratio of the MR stripe. When the length to height ratio is higher, the uniform response portion at a given reference value or percentage of the amplitude response is greater. This characteristic cannot be optimized to the ideal condition since a lower length to height ratio yields a higher signal amplitude for a constant current density. Thus the designer is required to make a value judgement or trade off with respect to uniformity of response and amplitude of signal. The curve 2C represents a typical response curve which balances the competing requirements.

Figure 3:
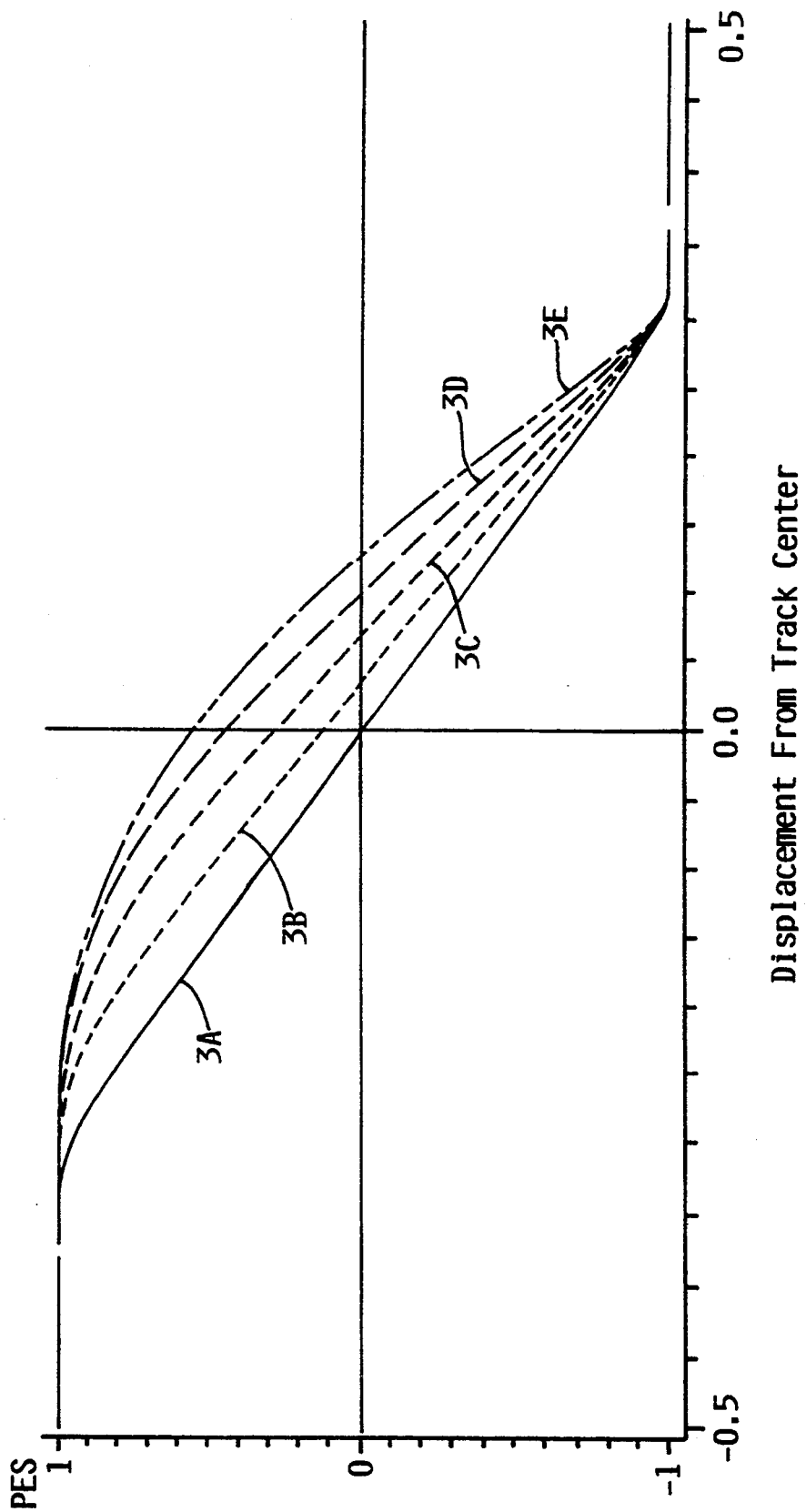
FIG. 3 is a graph modeling servo PES linearity for the uniform and increasingly asymmetrical MR response functions illustrated in FIG. 2.

The graph of FIG. 3 plots the PES against the unity pitch. The ideal symmetrical signal would produce PES linearity substantially across the width of the sensor and the increasing asymmetry progressively reduces the linear response region, the substantially straight line inclined curve portion. The linear portion of curves 3A through 3E is effectively the function of the progressively reduced length of the 50% reference line R in FIG. 2. As the sensor moves over the A and B bursts the PES would be accurate if the ideal linear response was received as indicated by curve 3A which passes through 0 PES when the sensor is aligned with the track centerline. However, the asymmetry of actual MR sensors, as indicated by the progressively increasing asymmetry of curves 3B through 3E, cause the response curve to be displaced as a result of the degree of asymmetry caused by the MR sensor varied amplitude response characteristic. The response asymmetry cannot be eliminated in the MR sensor design since a trade-off is required between signal amplitude and the degree of asymmetry of the response for the given design and manufacturing tolerances. This variation of signal amplitude across the sensor width is not as highly significant when reading data, but becomes a substantial factor in the servo function during either access or track follow when signal amplitudes at the right and left sides of the MR sensor are compared to generate a PES.

Figure 4:
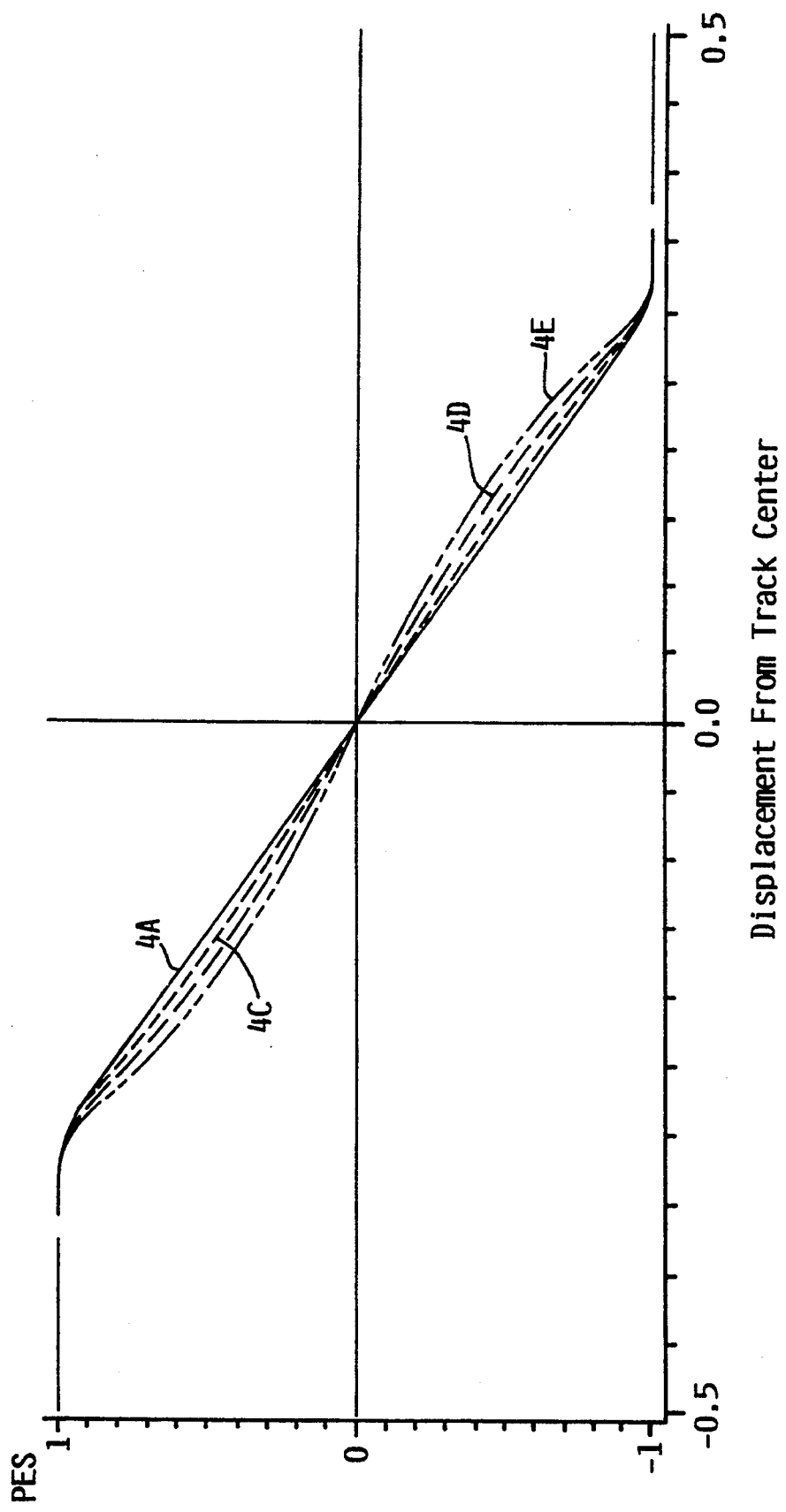
FIG. 4 is a graph illustrating the effect of MR bias reversal on PES linearity modeled for the sensor responses of FIG. 2.

By reversing the electrical bias on the MR sensor with respect to the A and B bursts of the servo, a reversal or mirror image of the asymmetrical MR sensor response curve is attained so that in reading the A and B bursts of FIG. 1 the asymmetries of the response are substantially cancelled. As shown in FIG. 4, this results in a PES of zero at the position of sensor alignment with the track centerline with the residual effects of the non-linear signals (curves 4C through 4E) relegated to a modest distortion between the PES and the displacement of the sensor from the track centerline.

Figure 5:
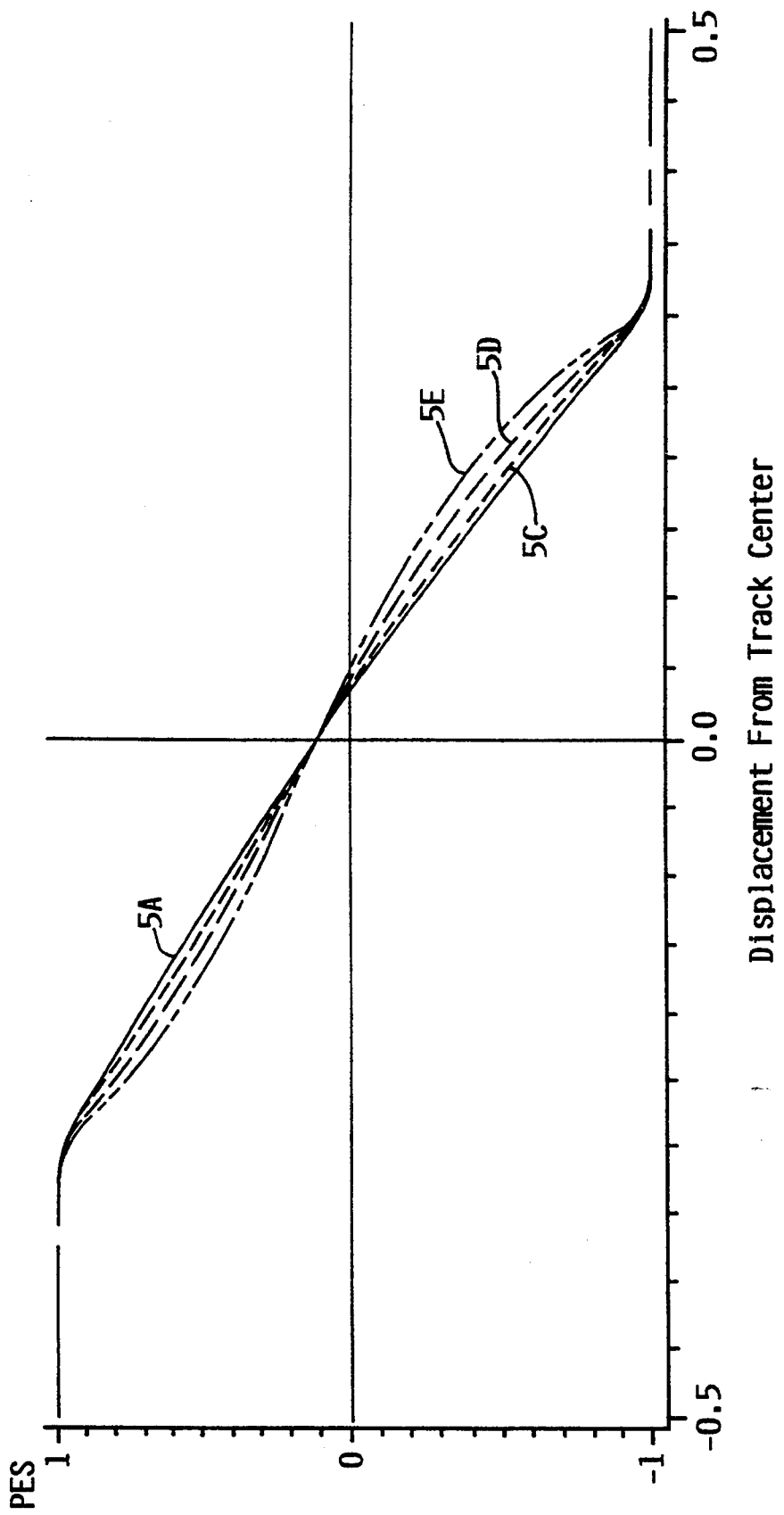
FIG. 5 is a graph illustrating the effect of MR bias reversal on PES linearity, wherein sensor gain with bias in one direction is 80% the sensor gain with the bias in the other direction.
Figure 6:
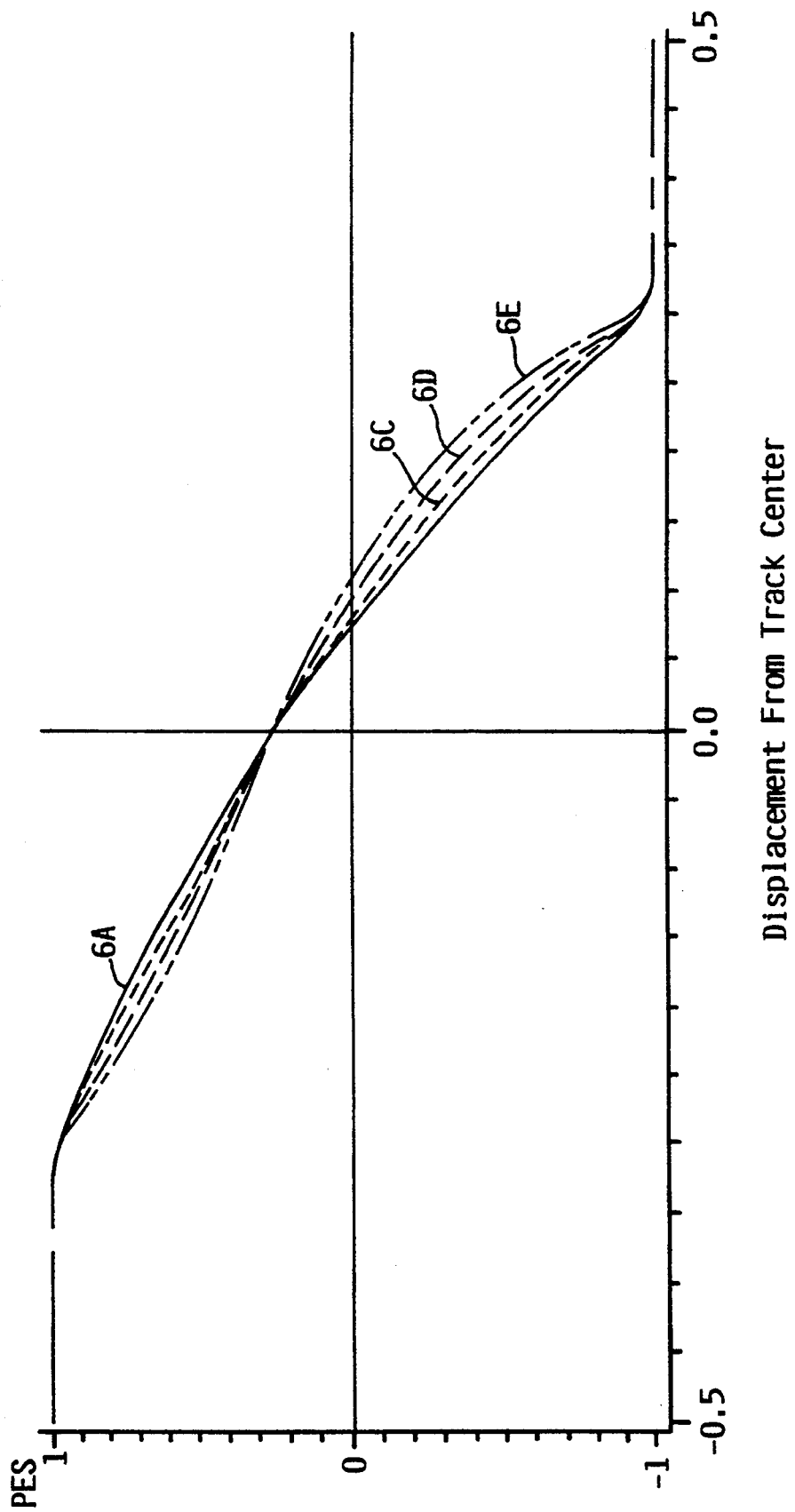
FIG. 6 is similar to FIG. 5 wherein sensor gain is 60% in one direction.

A further effect of the PES signal amplitudes experienced during the use of a reverse bias sensor is that the maximum amplitude of the MR response using a bias current in one direction differs from the maximum amplitude of the MR response when the sensor has bias current applied in the opposite direction. This phenomena is illustrated by the curves (5A through 5E) of FIG. 5 where one amplitude is 80% of the other and in FIG. 6 (curves 6A through 6E) where one amplitude is 60% of the other. Comparison of FIGS. 4, 5 and 6 shows that the variations in sensor gains results in changes to the measured track center position and linearity. If the gain values remained the same, the effect would be a displacement of all track centerlines a uniform distance so that a nominal track centerline would be established and repeated without affecting the accuracy of reading or writing data. However, if changes in gain occur, the sensed track centerline moves radially and introduces all the associated problems, such as, overwriting adjoining tracks and increasing read errors as the read element is misaligned with the data or portions of the data have been erased during the writing of adjacent tracks. The impact of this effect can be considerably diminished through multiple methods. The sensor could be designed to have improved uniformity of gain for either direction of bias current, a normalization field could be provided as part of the servo pattern or reserved area of the disk to be used to normalize the head output for each bias direction, or the bias current could be varied based upon a previous characterization to compensate for the gain change. The normalization field would provide the benefit of compensating for gain changes caused by individual current cycles (bias dependent instabilities) which is recognized to directly cause an increase to TMR with this type of system.

Figure 7:
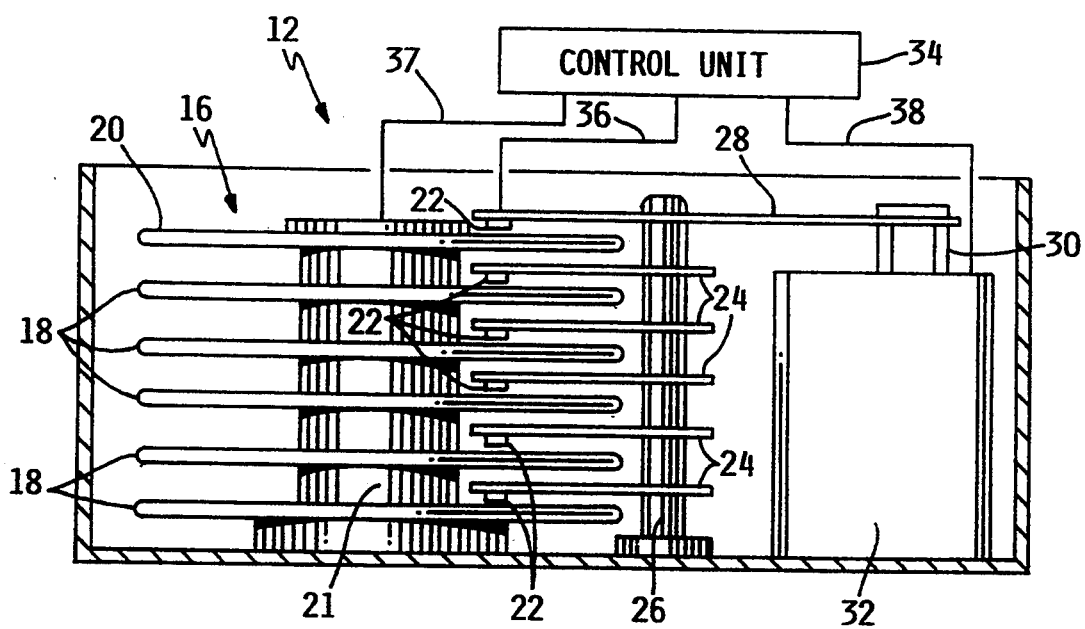
FIG. 7 is a schematic elevation of a typical magnetic disk drive.

A typical magnetic disk drive is shown in FIG. 7. A disk drive unit 12 includes a stack 16 of disks 18, each of which has at least one magnetic data storage surface 20, with the disk stack being rotated in unison by a spindle motor mounted concentrically within spindle 21. Transducer heads 22 are supported on arm-suspension assemblies 24 which are ganged together for simultaneous pivotal movement about an actuator support spindle 26. One arm assembly 24 includes an extension 28 on which is supported a voice coil 30. A voice coil motor 32 drives the voice coil 30 to move the heads 22 from one concentric track to another concentric track on the confronting data surface 20 or to cause the transducer head to be aligned with a selected data track centerline during read or write operations. The various components of the disk file are controlled in operation by signals generated by control unit 34 through signal and control lines 36. 37 and 38 respectively connected to the heads 22, the spindle motor and voice coil 30.

Figure 8:
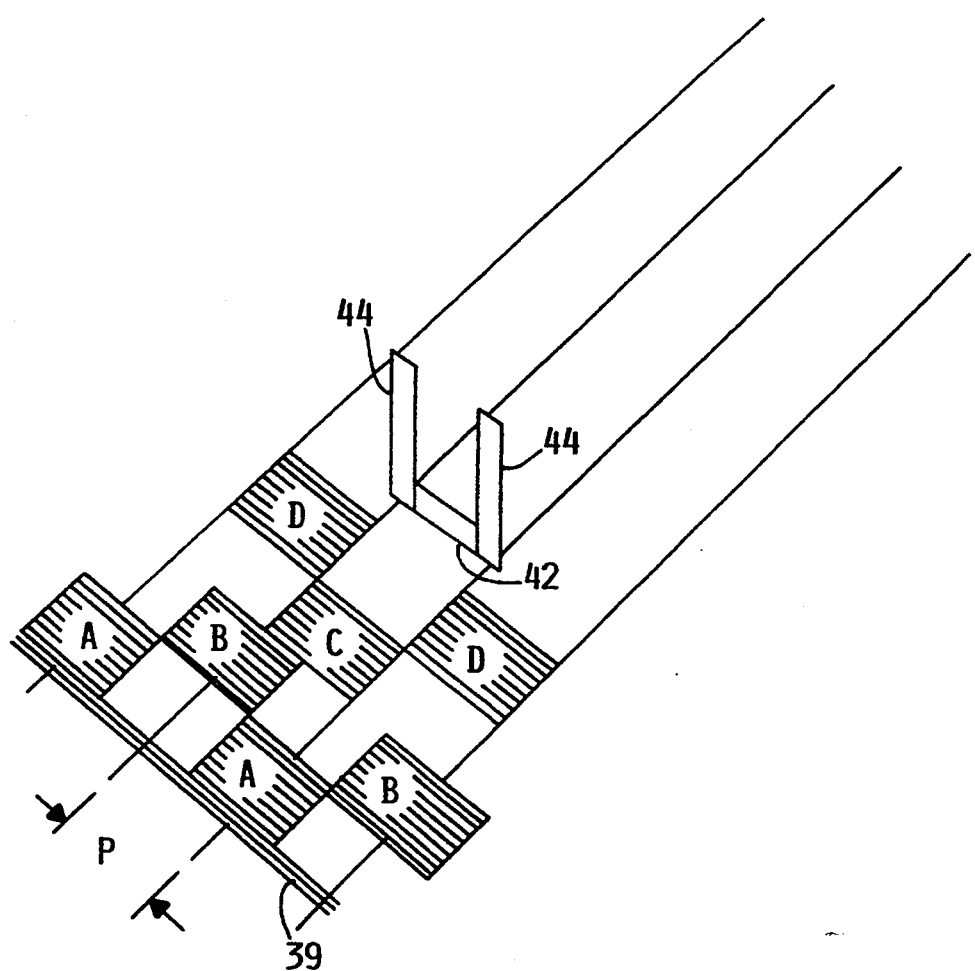
FIG. 8 is a schematic showing of an MR sensor in cooperation with tracks of a data disk employing a quadrature type servo system.

FIG. 8 schematically illustrates a sequence of data tracks (which are concentric circular tracks on the disk surface) that include a servo header portion 39 followed successively by A and B servo bursts: C and D quadrature servo bursts and the data sector portion. The transducer head MR sensor 42 has a length of about 0.6 the track pitch P; is aligned with the track centerline to read and write data and includes the bias leads 44.

Figure 9:
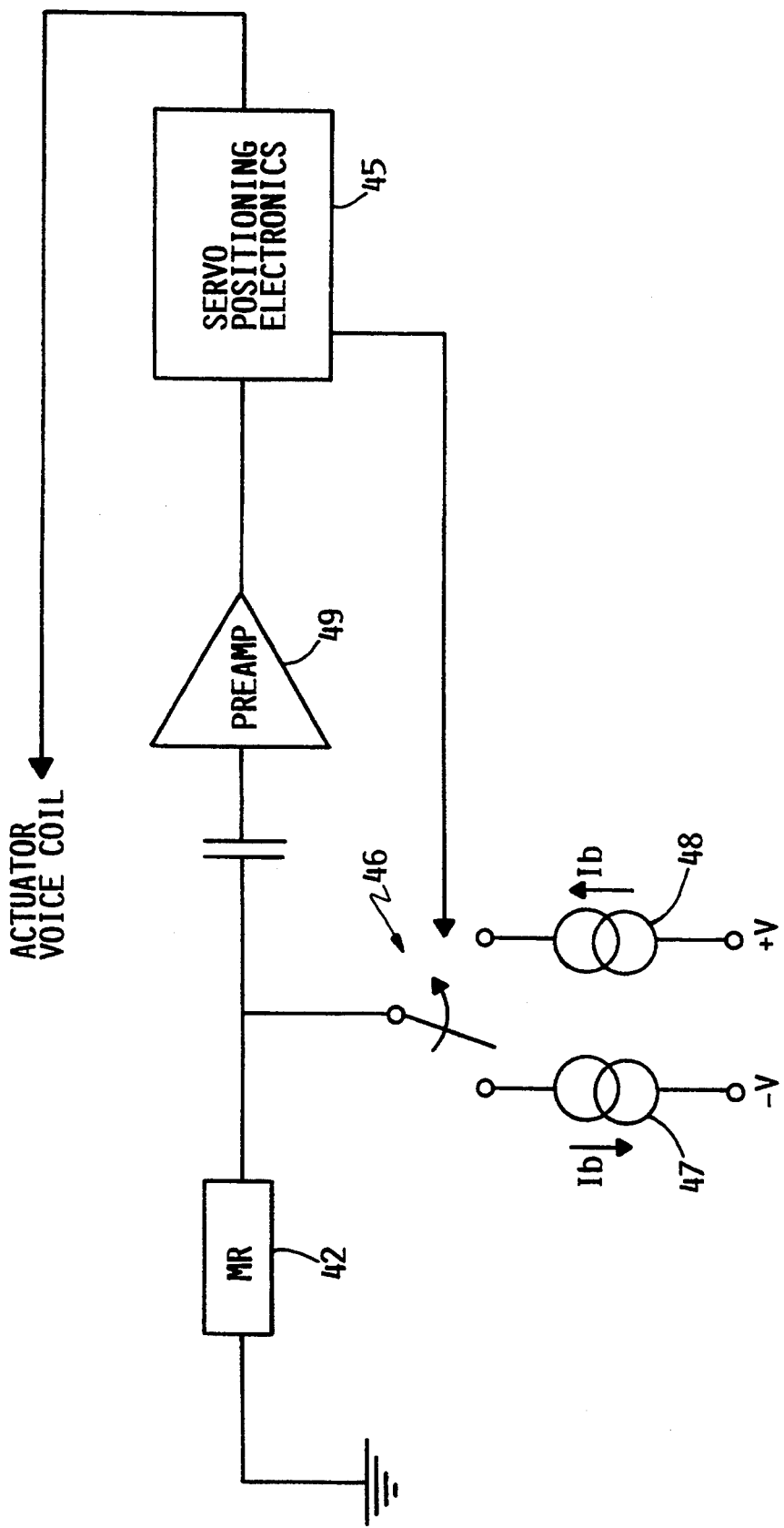
FIG. 9 is a block diagram of a circuit for implementing the bias reversal technique of the present invention.

The servo control, in accordance with the invention, is practiced by a portion of the control circuitry as schematically illustrated in FIG. 9. The sensor reads the servo header 39 which indicates that servo bursts are to follow and identifies the track type as odd or even. The servo positioning electronics 45 activates switch 46 to connect one of the bias current sources 47, 48 to the MR sensor 42 in accordance with the side of the track at which the A burst will be encountered and following the A burst, reverses the bias current direction by switching to the other of the current sources 47, 48 for the period during which the sensor passes the B burst. The signal from sensor 42, amplified by preamp 49, is connected to the servo positioning electronics 45 which compares the servo bursts and either pulses the voice coil in the direction indicated by the TMR value or refrains from transmitting a control pulse when the sensor is aligned with the track centerline or is within a predetermined minimum TMR value.

While the invention has been shown and described with respect to a preferred embodiment thereof, it will be understood by those skilled in the art that changes in the form and detail may be made in this embodiment without departing from the scope and teaching of the invention. Accordingly, the apparatus and method herein disclosed are to be considered as merely illustrative, and the invention is to be limited only as specified in the claims.

What is claimed is:

1. In a data storage device wherein data is stored in tracks on a magnetic media surface which uses a magneto resistive (MR) head to read data, a servo system for controlling the head position comprising
   a servo pattern written on said magnetic media surface including first and second servo bursts wherein said first servo burst is displaced to one side of the track centerline and said second servo burst is displaced to the side of said track centerline opposite said one side;
   means for determining when first or second servo bursts are to be read; and
   means for biasing said MR head in one direction when reading said first servo burst and in the direction opposite said one direction when reading said second servo burst.

2. The data storage device of claim 1 wherein said means for biasing said MR head comprises passing a bias current through said MR sensor in one direction when reading said first servo burst and passing a bias current in the direction opposite said one direction when reading said second servo burst.

3. The data storage device of claim 2 wherein said one direction of bias current is selected to cause the sensor side having the most symmetrical response portion to be disposed in the direction of displacement of said first servo burst while reading said first servo burst.

4. The data storage device of claim 2 wherein said first and second servo bursts are written as fractional track width bursts within said servo pattern.

5. The data storage device of claim 3 wherein said first and second servo bursts are written as half track bursts within said servo pattern.

6. The data storage device of claim 4 further comprising normalizing means for equalizing the gain of the responses from said first and second servo bursts.

7. The method of maintaining alignment of a magnetic transducer head including a magneto resistive (MR) sensor with respect to a magnetic media data track comprising
   writing a servo pattern with first and second successive servo bursts displaced to opposite sides of the track centerline;
   reading said first and second successive servo bursts using said MR sensor;
   calculating a track position error signal (PES) value indicative of transducer head position using the difference of MR responses while reading said first and second servo bursts; and
   electrically biasing said MR sensor in one direction while reading said first servo burst and electrically biasing said MR sensor in the direction opposite said one direction during the reading of said second servo burst.

8. The method of claim 7 wherein said step of electrically biasing comprises passing a bias current through said MR sensor in one direction while reading said first servo burst and passing a bias current through said MR sensor in the direction opposite said one direction during reading of said second servo burst.

9. The method of claim 7 wherein during the step of biasing said MR sensor said MR sensor is biased in the direction that presents the most symmetrical response portion of said sensor at the side at which said first servo burst is displaced during the reading of said first servo burst and said MR sensor is biased in the direction that presents the most symmetrical response portion of said sensor at the side at which said second servo burst is displaced during the reading of said second servo burst.

10. The method of claim 9 further comprising the step of normalizing sensor output using normalizing means to compensate for sensor gain differences between bias directions.

11. The method of claim 7 further comprising writing third and fourth quadrature servo bursts successively subsequent to said first and second servo bursts within said servo pattern and wherein said reading step includes reading said third and fourth servo bursts and said step of calculating a PES value includes selecting said first and second burst responses or said third and fourth burst responses to obtain the most linear PES value.

* * * * *